United States Patent
Pohl et al.

(10) Patent No.: US 10,523,961 B2
(45) Date of Patent: Dec. 31, 2019

(54) MOTION ESTIMATION METHOD AND APPARATUS FOR PLURALITY OF FRAMES

(71) Applicant: Samsung Electronics Co., Ltd., Suwon-si, Gyeonggi-do (KR)

(72) Inventors: Petr Pohl, Moscow (RU); Alexey Mikhailovich Gruzdev, Moscow (RU); Igor Mironovich Kovliga, Moscow (RU); Valery Valerievich Anisimovskiy, Moscow (RU); Roman Arzumanyan, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/053,233

(22) Filed: Aug. 2, 2018

(65) Prior Publication Data

US 2019/0045211 A1 Feb. 7, 2019

(30) Foreign Application Priority Data

Aug. 3, 2017 (RU) .................. 2017127691
Jul. 30, 2018 (KR) .................. 10-2018-0088654

(51) Int. Cl.
*H04N 19/51* (2014.01)
*H04N 19/52* (2014.01)
(Continued)

(52) U.S. Cl.
CPC ............ *H04N 19/51* (2014.11); *G06T 7/238* (2017.01); *H04N 19/52* (2014.11);
(Continued)

(58) Field of Classification Search
CPC ...... H04N 19/51; H04N 19/52; H04N 19/587; H04N 19/577; H04N 19/521; G06T 7/238
(Continued)

(56) References Cited

U.S. PATENT DOCUMENTS 6,058,212 A 5/2000 Yokoyama
6,154,519 A 11/2000 Florent et al.
(Continued)

FOREIGN PATENT DOCUMENTS

CN 101068357 A 11/2007
EP 1 128 678 A1 8/2001
(Continued)

OTHER PUBLICATIONS

Ko et al., 'An efficient parallel motion estimation algorithm and X264 parallelization in CUDA', 2011 Conference on Design and Architectures for Signal and Image Processing, DASIP 2011, Tampere, Finland, Nov. 2-4, 2011.
(Continued)

*Primary Examiner* — Dominic D Saltarelli
(74) *Attorney, Agent, or Firm* — Jefferson IP Law, LLP

(57) ABSTRACT

A motion estimation method for video data including frames and an apparatus therefor are provided. The motion estimation method includes determining whether a current frame unit for which motion estimation is to be performed corresponds to a double block, when the current frame unit corresponds to a double block, acquiring a candidate vector set corresponding to a first single block included in the double block, as a candidate vector set of the double block, individually calculating a confidence function value of each candidate vector included in the candidate vector set of the double block, for the first single block and a second single block included in the double block, and acquiring an estimated motion vector of the first single block and an estimated motion vector of the second single block, based on the calculated confidence function value of each candidate vector.

16 Claims, 14 Drawing Sheets

(51) Int. Cl.
*H04N 19/587* (2014.01)
*H04N 19/577* (2014.01)
*G06T 7/238* (2017.01)
*H04N 19/513* (2014.01)

(52) U.S. Cl.
CPC ......... *H04N 19/521* (2014.11); *H04N 19/577* (2014.11); *H04N 19/587* (2014.11)

(58) Field of Classification Search
USPC .................. 375/240.16, 240.21, 240.29
See application file for complete search history.

(56) References Cited

U.S. PATENT DOCUMENTS

| | | | |
|---|---|---|---|
| 6,229,570 | B1 | 5/2001 | Bugwadia et al. |
| 6,240,211 | B1 | 5/2001 | Mancuso et al. |
| 6,278,736 | B1 | 8/2001 | De Haan et al. |
| 6,442,203 | B1 | 8/2002 | Demos |
| 6,731,818 | B1 | 5/2004 | Conklin |
| 6,760,378 | B1 | 7/2004 | Conklin |
| 6,782,054 | B2 | 8/2004 | Bellers |
| 6,900,846 | B2 | 5/2005 | Lee et al. |
| 6,996,175 | B1 | 2/2006 | Olivieri |
| 6,996,177 | B1 | 2/2006 | Beuker |
| 7,408,986 | B2 | 8/2008 | Winder |
| 8,009,174 | B2 | 8/2011 | Beric et al. |
| 8,175,163 | B2 | 5/2012 | Chappalli et al. |
| 8,265,160 | B2 | 9/2012 | Al-Kadi et al. |
| 8,699,574 | B2 | 4/2014 | Zhou et al. |
| 8,861,603 | B2 | 10/2014 | Lertrattanapanich et al. |
| 9,282,338 | B2 | 3/2016 | Zheng et al. |
| 2004/0046891 | A1 | 3/2004 | Mishima et al. |
| 2004/0246374 | A1 | 12/2004 | Mishima et al. |
| 2005/0053291 | A1 | 3/2005 | Mishima et al. |
| 2005/0265451 | A1 | 12/2005 | Shi et al. |
| 2006/0002465 | A1 | 1/2006 | Raveendran et al. |
| 2006/0017843 | A1 | 1/2006 | Shi et al. |
| 2006/0262853 | A1 | 11/2006 | Li et al. |
| 2007/0014477 | A1* | 1/2007 | MacInnis ............... H04N 19/51 382/236 |
| 2007/0230563 | A1 | 10/2007 | Tian et al. |
| 2007/0242748 | A1 | 10/2007 | Mahadevan et al. |
| 2007/0297513 | A1 | 12/2007 | Biswas et al. |
| 2008/0204592 | A1 | 8/2008 | Jia et al. |
| 2008/0317129 | A1 | 12/2008 | Lertrattanapanich et al. |
| 2010/0166073 | A1 | 7/2010 | Schmit et al. |
| 2010/0177933 | A1 | 7/2010 | Willmann et al. |
| 2010/0201870 | A1 | 8/2010 | Luessi et al. |
| 2010/0328538 | A1 | 12/2010 | Al-Kadi et al. |
| 2011/0176613 | A1 | 7/2011 | Tsai et al. |
| 2012/0162375 | A1 | 6/2012 | Vlutters et al. |
| 2013/0279590 | A1 | 10/2013 | Chen et al. |
| 2014/0286428 | A1 | 9/2014 | Lee et al. |
| 2015/0110190 | A1 | 4/2015 | Sartor et al. |
| 2016/0021386 | A1* | 1/2016 | Fishwick ............... H04N 5/145 375/240.16 |

FOREIGN PATENT DOCUMENTS

| | | |
|---|---|---|
| EP | 2 304 931 B1 | 10/2015 |
| EP | 3 104 611 A1 | 12/2016 |
| RU | 2 538 937 C2 | 1/2015 |

OTHER PUBLICATIONS

Lee et al., 'Variable block size motion estimation implementation on compute unified device architecture (CUDA)', 2013 IEEE International Conference on Consumer Electronics (ICCE), Las Vegas, NV, pp. 633-634, Jan. 11-14, 2013.

International Search Report dated Nov. 20, 2018; International Application #: PCT/KR2018/008825; International filing dated Aug. 3, 2018.

* cited by examiner

MOTION ESTIMATION METHOD AND APPARATUS FOR PLURALITY OF FRAMES

CROSS-REFERENCE TO RELATED APPLICATION(S)

This application is based on and claims priority under 35 U.S.C. § 119 of a Russian patent application number 2017127691, filed on Aug. 3, 2017, in the Russian Patent Office, and of a Korean patent application number 10-2018-0088654, filed on Jul. 30, 2018, in the Korean Intellectual Property Office, the disclosure of each of which is incorporated by reference herein in its entirety.

BACKGROUND

1. Field

The disclosure relates to a motion estimation method and apparatuses for a plurality of frames. More particularly, the disclosure relates to a motion estimation method and apparatuses for video frame rate conversion.

2. Description of Related Art

Motion estimation is an important factor in many algorithms used to encode a video, convert a video frame rate, and create a mobile image structure. However, since a motion estimation algorithm significantly depends of a task set, a single general-use algorithm executable in any application program in the same way does not exist.

For example, motion estimation in response to frame rate conversion for playing back a video in a mobile device has characteristics and complexity such as performance limitation, power limitation, a complex motion, motion artifacts occurring on a boundary line of a moving object, and a sudden and non-smooth twitchy operation.

To improve the performance and simultaneously satisfy increasing requests of a user and to improve video recognition, requirements for motion estimation in response to frame rate conversion have been continuously increasing.

For example, a mobile device uses video content of which a frame conversion rate is low, to save a memory space and reduce a necessary bandwidth of Internet traffic or reduce camera-related requirements.

Playing back video content without additional processing may include a visible twitchy operation and a non-smooth operation, and thus the playing back video content without additional processing is not always allowed to a user.

Therefore, to improve smoothness of a motion in a video being played, it is necessary to increase a frame rate, and such a frame rate conversion algorithm needs to satisfy several requirements such as robustness to noise, high performance, conversion close to a real motion, multi-threading, mobility, the possibility of a real-time work, and low power consumption.

FIG. 1 shows an example of an existing three-dimensional recursive search (3DRS) meandering scan sequence according to the related art.

Existing 3DRS motion estimation is performed by using a meandering scan search pattern 101 in which a trajectory of a scanning frame block is looked like meandering.

A search result is stored in a circulating memory buffer having a control unit adapted to a meandering scan sequence when a motion vector is received and having a raster scan sequence 103 when a motion vector for a motion compensation (MC) unit is output. Suh as a circular buffer memorizes a necessary quantity. However, this solution cannot provide improved performance in a multi-core system widely used at the moment.

FIG. 2 shows an example in which existing 3DRS meandering scan is individually performed through separate threads according to the related art.

Motion estimation (ME) is performed at the same time for each of individual parts, and several parallel threads may improve the motion estimation calculation performance in a multi-core system. However, this approach has many disadvantages.

For example, the fact that block scanning directions at adjacent parts between blocks are opposite causes non-locality in a memory access, thereby decreasing the performance.

In addition, block movement in odd and even lines may be dispersed in different directions, thereby causing an interlaced effect on an edge of an object.

In addition, motion estimation of a single thread (a thread ME1 and a block A in FIG. 2) is based on blocks adjacent to a current block, and an estimation process in the other threads (threads ME2, ME3, and ME4 and blocks B, C, and D in FIG. 2) inevitably uses some blocks spaced apart by certain distances from a current block, which may cause an error, instead of adjacent blocks.

In addition, motion estimation in some threads (threads ME2, ME3, and ME4 in FIG. 2) is based on estimation already performed by another thread, and this motion estimation cannot make strong synchronization between threads and self-processing fully independent and may decrease estimation performance.

FIG. 3 shows an example of existing 3DRS motion estimation using block-based motion estimation (BME) and global motion estimation (GME) according to the related art.

Referring to FIG. 3, another approach to a task set which performs 3DRS motion estimation using the BME and the GME is shown. Herein, the GME uses motion vector statistics of the BME in operation 31 and outputs a candidate vector of a global motion to the BME in operation 32.

However, the GME in this solution uses too simple motion vector statistics (that is, uses first and second motion vectors among motion vectors most frequently used in the BME), and thus the GME is not sufficient to obtain a quality result.

In addition, a GME result of this solution is applied to the entire frame, but one or two global motion vectors may not be often suitable for another portion of the frame, and since an acquired motion field is not matched with a real motion field, a stepped shape, that is, motion artifacts, may occur on a boundary of a moving object during frame rate conversion.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a motion estimation method and apparatuses for video frame rate conversion.

The purposes of the disclosure are not limited to the aforementioned purposes, other purposes and strengths of the disclosure, which have not mentioned, could be understood by the following description and would be more clearly understood by embodiments of the disclosure. In addition, it will be easily understood that the purposes and strengths of the disclosure are implemented by means disclosed in the claims and a combination thereof.

Additional aspects will be set forth in part in the description which follows and, in part, will be apparent from the description, or may be learned by practice of the presented embodiments.

In accordance with an aspect of the disclosure, a motion estimation method for a plurality of frames is provided. The motion estimation method includes determining whether a current frame unit for which motion estimation is to be performed corresponds to a double block, when the current frame unit corresponds to the double block, acquiring a candidate vector set corresponding to a first single block included in the double block, as a candidate vector set of the double block, individually calculating a confidence function value of each candidate vector included in the candidate vector set of the double block, for the first single block and a second single block included in the double block, and acquiring an estimated motion vector of the first single block and an estimated motion vector of the second single block, based on the calculated confidence function value of each candidate vector.

The acquiring the estimated motion vector of the first single block and the estimated motion vector of the second single block may include selecting a candidate vector having a minimum confidence function value for the first single block among the candidate vectors as the estimated motion vector of the first single block and selecting a candidate vector having a minimum confidence function value for the second single block among the candidate vectors as the estimated motion vector of the second single block.

The candidate vector set may include at least one of spatial candidate vectors, temporal candidate vectors, and/or random candidate vectors.

The motion estimation method may further include analyzing a confidence function value of the estimated motion vector of the first single block and a confidence function value of the estimated motion vector of the second single block, determining whether a motion vector of the second single block is individually estimated, based on the analysis result, and when it is determined that the motion vector of the second single block is individually estimated, re-acquiring an estimated motion vector of the second single block.

The re-acquiring of the estimated motion vector of the second single block may include acquiring a candidate vector set corresponding to the second single block and selecting a candidate vector having a minimum confidence value for the second single block among candidate vectors of the second single block, as the estimated motion vector of the second single block.

The analyzing of the confidence function value of the estimated motion vector of the first single block and the confidence function value of the estimated motion vector of the second single block may include calculating an absolute value of a difference between the confidence function value of the estimated motion vector of the first single block and the confidence function value of the estimated motion vector of the second single block and comparing the calculated absolute value with a preset first threshold.

The determining of whether the motion vector of the second single block is individually estimated may include determining that the motion vector of the second single block is individually estimated, when the calculated absolute value is greater than or equal to the first threshold.

The analyzing of the confidence function value of the estimated motion vector of the first single block and the confidence function value of the estimated motion vector of the second single block may further include comparing the confidence function value of the estimated motion vector of the second single block with a preset second threshold.

The determining of whether the motion vector of the second single block is individually estimated may include determining that the motion vector of the second single block is individually estimated, when the confidence function value of the estimated motion vector of the second single block is greater than or equal to the second threshold.

The acquiring the candidate vector set corresponding to the first single block as the candidate vector set of the double block may include selecting a temporal candidate vector from a backward motion field estimated for a pair of a previous frame and a current frame in estimation of a forward motion field for the current frame, and selecting a temporal candidate vector from a forward motion field estimated for a pair of the current frame and a subsequent frame in estimation of a backward motion field for the current frame.

The motion estimation may be performed for aggregate frame units indicating a set of neighboring frame units in a row of a frame, and the aggregate frame units may be scanned in a diagonal scanning direction starting from an aggregate frame unit located at any one edge among edges of the frame.

The motion estimation may be simultaneously performed in two or more processing threads configured to individually process each aggregate frame unit.

The random candidate vector may be acquired by adding a random offset to a semi-global motion vector (SGMV) of the current frame when an applicable mask in the current frame unit is in an activated state.

The semi-global motion vector may be acquired through an analysis on a two-dimensional histogram of a previously estimated motion field of the current frame, and the applicable mask may be formed in a frame region in which an object motion corresponding to the acquired semi-global motion vector exists.

The individually calculating of the confidence function value of each candidate vector may include calculating a mean absolute difference (MAD) between blocks, which is indicated by the current frame unit and each candidate vector, calculating a penalty function value based on a distance between each candidate vector and the semi-global motion vector, and acquiring the confidence function value by adding the MAD and the penalty function value.

In accordance with another aspect of the disclosure, a motion estimation apparatus for a plurality of frames is provided. The motion estimation apparatus includes at least one processor configured to determine whether a current frame unit for which motion estimation is to be performed corresponds to a double block, when the current frame unit corresponds to the double block, acquire a candidate vector set corresponding to a first single block included in the double block, as a candidate vector set of the double block, individually calculate a confidence function value of each candidate vector included in the candidate vector set of the double block, for the first single block and a second single block included in the double block, and acquire an estimated motion vector of the first single block and an estimated motion vector of the second single block, based on the calculated confidence function value of each candidate vector, and a memory configured to store the estimated motion vector of the first single block and the estimated motion vector of the second single block.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
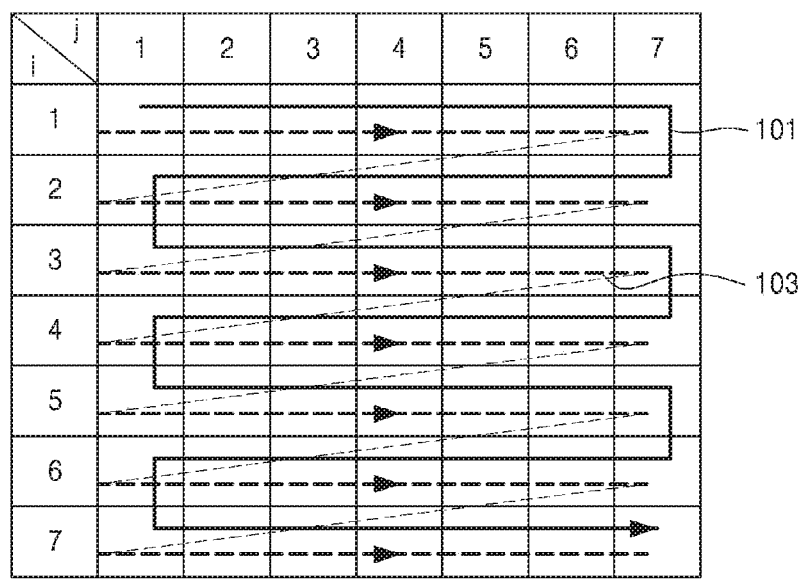
FIG. 1 shows an example of an existing three-dimensional recursive search (3DRS) meandering scan sequence according to the related art.
Figure 2:
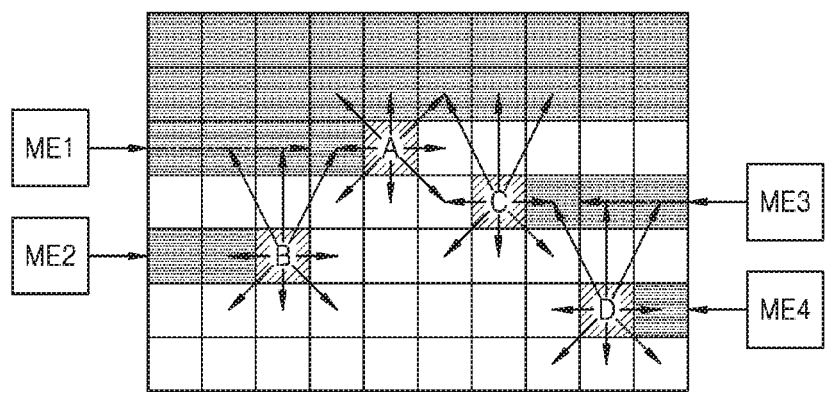
FIG. 2 shows an example in which existing 3DRS meandering scan is individually performed through separate threads according to the related art.
Figure 3:
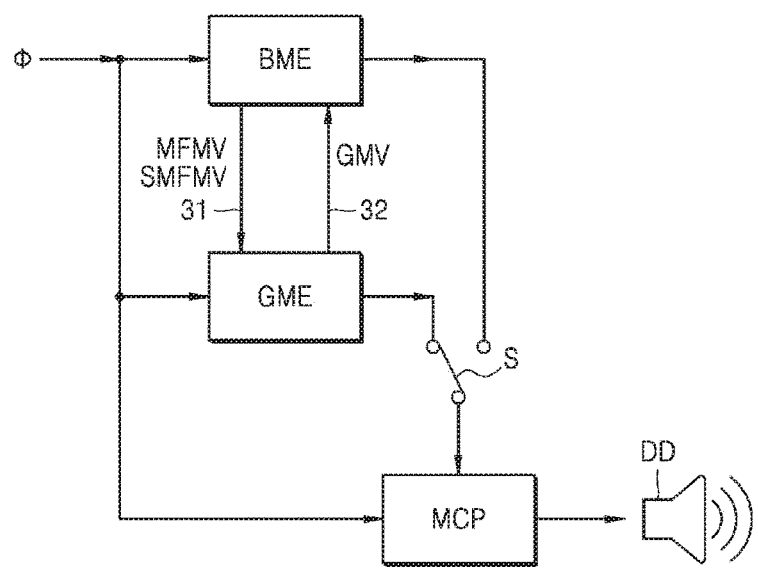
FIG. 3 shows an example of existing 3DRS motion estimation using block-based motion estimation (BME) and global motion estimation (GME) according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A three-dimensional recursive search (3DRS) algorithm in the disclosure is used to search for a block motion field by using sequential iterations in one pair of video sequence frames.

In addition, a motion field in the disclosure is a set of motion vectors, and each motion vector corresponds to each pixel or a block of a current frame, that is, a set of adjacent pixels commonly in a shape of a square or rectangle.

Herein, a motion vector corresponds to a coordinate difference of two blocks, which is an offset between a block of the current frame and a block of another frame. This offset may include both integer pixel precision and fraction pixel precision.

Therefore, each motion vector always indicates another frame, and the existence of a motion field indicates that the current frame and another frame (for example, a subsequent frame or a previous frame) exist.

A motion estimation process of the disclosure includes a process of checking the existence of a plurality of candidate vectors for each block, that is, a vector usable for motion estimation. In this case, a candidate vector having the best estimation value among the plurality of candidate vectors may be a motion vector of a current block.

The plurality of candidate vectors constitute candidate vector sets, and the simplest candidate vector set may include all possible offsets which may exist in a frame.

However, the candidate vector set including all the possible offsets has a too large size. For example, when a particular offset exists for each pixel, the number of candidate vectors included in a candidate vector set is the same as the total number of pixels included in a frame.

When a candidate vector set for a current block is formed, both motion vectors previously estimated from neighboring blocks of a current motion field (referred to as spatial candidate vectors) and motion vectors included a previously calculated motion field (referred to as temporal candidate vectors) are used.

In addition, a random offset related to a zero offset and a random offset for another candidate vector (referred to as a random candidate vector) may be used.

In addition, when global motion estimation (GME) is used, the candidate vector set may include a global motion vector (may be referred to as global candidate vectors). In this case, random candidate vectors may be obtained by adding random offsets to a global candidate vector.

Figure 4:
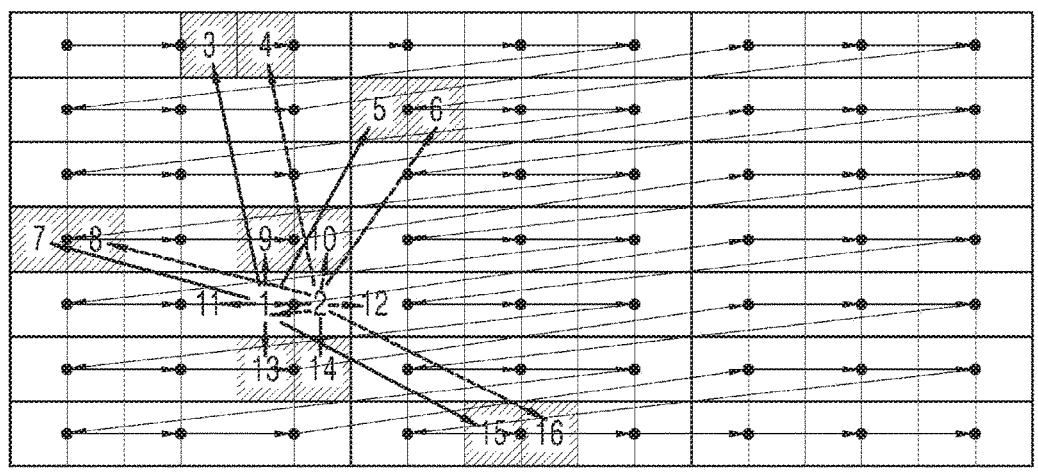
FIG. 4 shows an example a motion estimation method using an existing 3DRS motion estimation algorithm according to an embodiment of the disclosure.

FIG. 4 shows an example a motion estimation method using an existing 3DRS motion estimation algorithm according to an embodiment of the disclosure.

Referring to FIG. 4, a candidate vector set may be individually formed for each single block.

For example, for a first block 1, a candidate vector set including a total of nine candidate vectors may be formed by selecting spatial candidate vectors from a third block 3, a fifth block 5, a seventh block 7, a ninth block, and an eleventh block in a current motion field and selecting temporal candidate vectors from the first block 1, a second block 2, a thirteenth block 13, and a fifteenth block 15 in a previously calculated motion field.

For the second block 2, a candidate vector set including a total of nine candidate vectors may be formed by selecting spatial candidate vectors from a fourth block 4, a sixth block 6, an eighth block 8, a tenth block, and the first block in the current motion field and selecting temporal candidate vectors from the second block 2, a twelfth block 12, a fourteenth block 14, and a sixteenth block 16 in the previously calculated motion field.

According to an embodiment, a block from which a candidate vector is to be selected may be determined according to the following rule.

An array (pattern) of blocks from which a candidate vector is to be selected is arranged such that a direction of an already estimated motion orients to a current block from a different direction, and a motion vector estimated according to this rule may converge to a real motion most quickly under a particular condition.

Blocks from which temporal candidate vectors are selected are arranged in a part from which a motion vector has not been estimated in the current motion field, and this is the reason why the previously calculated motion field is used.

Figure 5:
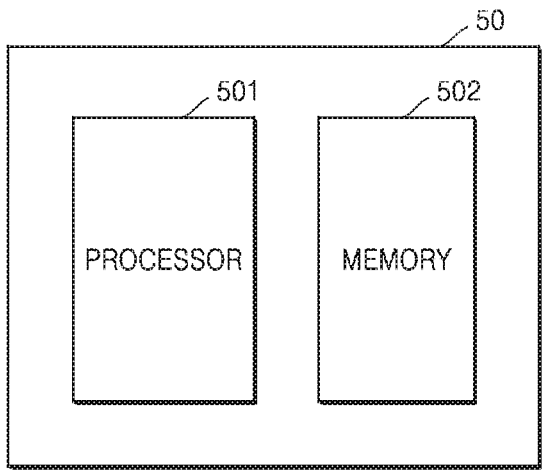
FIG. 5 is a block diagram of a motion estimation apparatus for a plurality of frames, according to an embodiment of the disclosure.

FIG. 5 is a block diagram of a motion estimation apparatus 50 for a plurality of frames, according to an embodiment of the disclosure.

Referring to FIG. 5, the motion estimation apparatus 50 according to an embodiment of the disclosure includes a processor 501 and a memory 502.

The processor 501 may determine whether a current frame unit for which motion estimation is to be performed corresponds to a double block.

When the current frame unit corresponds to a double block, the processor 501 may acquire a candidate vector set corresponding to a first single block included in the double block, as a candidate vector set of the double block.

The candidate vector set may include at least one of spatial candidate vectors, temporal candidate vectors, and/or random candidate vectors.

To acquire the candidate vector set of the double block, the processor 501 may select a temporal candidate vector from a backward motion field estimated for a pair of a previous frame and a current frame in estimation of a forward motion field for the current frame.

In addition, the processor 501 may select a temporal candidate vector from a forward motion field estimated for a pair of the current frame and a subsequent frame in estimation of a backward motion field for the current frame.

A method of selecting a candidate vector based on a previously estimated motion field will be described below with reference to FIG. 7.

The processor 501 may individually calculate a confidence function value of each candidate vector included in the candidate vector set of the double block, for the first single block and a second single block included in the double block.

The processor 501 may acquire an estimated motion vector of the first single block and an estimated motion vector of the second single block, based on the calculated confidence function value of each candidate vector.

In more detail, the processor 501 may select a candidate vector having a minimum confidence function value for the first single block among candidate vectors as the estimated motion vector of the first single block.

Likewise, the processor 501 may select a candidate vector having a minimum confidence function value for the second single block among the candidate vectors as the estimated motion vector of the second single block.

The processor 501 may determine whether a motion vector of the second single block is estimated individually from the motion vector of the first single block, based on an analysis result of the confidence function value of the estimated motion vector of the first single block and the confidence function value of the estimated motion vector of the second single block.

For example, the processor 501 may calculate an absolute value of a difference between the confidence function value of the estimated motion vector of the first single block and the confidence function value of the estimated motion vector of the second single block and compare the calculated absolute value with a preset first threshold.

When the calculated absolute value is greater than or equal to the first threshold, the processor 501 may determine that the motion vector of the second single block is individually estimated.

As another example, the processor 501 may compare the confidence function value of the estimated motion vector of the second single block with a preset second threshold.

When the confidence function value of the estimated motion vector of the second single block is greater than or equal to the second threshold, the processor 501 may determine that the motion vector of the second single block is individually estimated.

When it is determined that the motion vector of the second single block is individually estimated, the processor 501 may re-acquire an estimated motion vector of the second single block.

That is, the processor 501 may individually acquire a candidate vector set corresponding to the second single block and re-select a candidate vector having a minimum confidence function value for the second single block among the candidate vectors of the second single block, as the estimated motion vector of the second single block.

The motion estimation of the processor 501 may be performed for aggregate frame units indicating a set of neighboring frame units in a row of a frame.

This scanning for the aggregate frame units may be performed in a diagonal scanning direction starting from an aggregate frame unit located at any one edge among edges of the frame.

In this case, the motion estimation of the processor 501 may be simultaneously performed in two or more processing threads configured to individually process each aggregate frame unit.

The random candidate vector included in the candidate vector set may be acquired by adding a random offset to a semi-global motion vector (SGMV) of the current frame when an applicable mask in the current frame unit is in an activated state.

The semi-global motion vector may be acquired through an analysis on a two-dimensional histogram of a previously estimated motion field of the current frame. The applicable mask may be formed in a frame region in which an object motion corresponding to the acquired semi-global motion vector exists.

For the semi-global motion vector, the processor 501 may calculate a mean absolute difference (MAD) between blocks, which is indicated by the current frame unit and each candidate vector and calculate a penalty function value based on a distance between each candidate vector and the semi-global motion vector.

The calculated MAD and penalty function value may be added to each other by the processor 501 and thereafter used to acquire a confidence function value.

The memory 502 may store the acquired estimated motion vector of the first single block and the estimated motion vector of the second single block.

Figure 6:
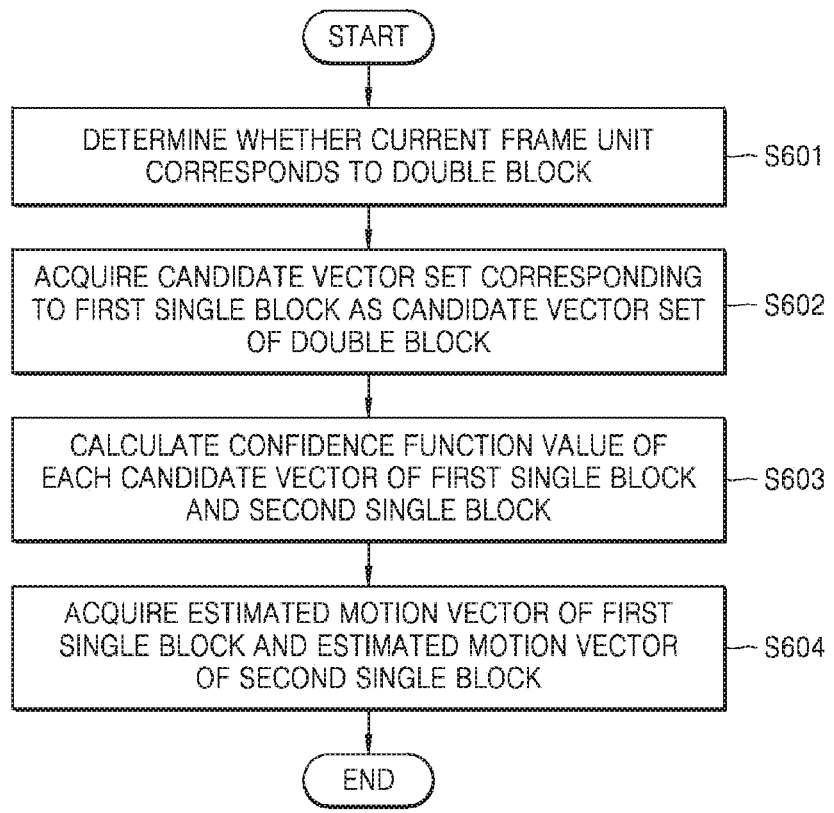
FIG. 6 is a flowchart of a motion estimation method for a plurality of frames, according to an embodiment of the disclosure.

FIG. 6 is a flowchart of a motion estimation method for a plurality of frames, according to an embodiment of the disclosure.

In operation S601, a processor determines whether a current frame unit for which motion estimation is to be performed corresponds to a double block.

In operation S602, when the current frame unit corresponds to a double block, the processor acquires a candidate vector set corresponding to a first single block included in the double block, as a candidate vector set of the double block.

In operation S603, the processor individually calculates a confidence function value of each candidate vector included in the candidate vector set of the double block, for the first single block and a second single block included in the double block.

In operation S604, the processor acquires an estimated motion vector of the first single block and an estimated motion vector of the second single block, based on the calculated confidence function value of each candidate vector.

Figure 7:
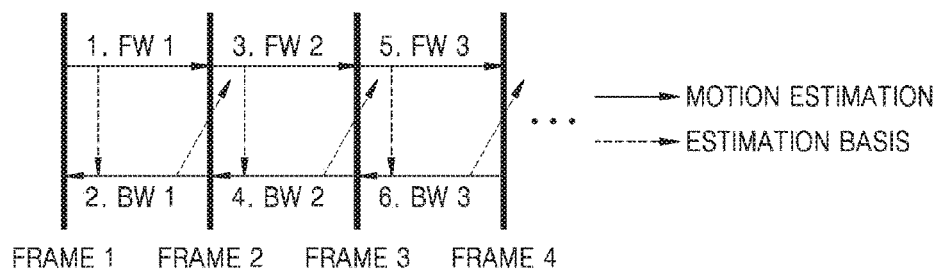
FIG. 7 conceptually shows an example in which a previously estimated motion field is used to estimate a motion field according to an embodiment of the disclosure.

FIG. 7 conceptually shows an example in which a previously estimated motion field is used to estimate a motion field according to an embodiment of the disclosure.

Referring to FIG. 7, a forward motion field FW and a backward motion field BW may be estimated for each pair of frames (for example, FRAME 1 and FRAME 2, FRAME 2 and FRAME 3, and FRAME 3 and FRAME 4).

A forward motion field FW<N> is a set of motion vectors for a current frame N and indicates a subsequent frame N+1. On the contrary, a backward motion field BW<N−1> is a set of motion vectors for the current frame N and indicates a previous frame N−1.

In the estimation of the forward motion field FW<N>, a temporal candidate is selected from the backward motion field BW<N−1> estimated for a pair of the previous frame and the current frame (N−1, N).

In more detail, in the estimation of the forward motion field FW<N>, a temporal candidate may be selected from a motion field in which a sign of the backward motion field BW<N−1> estimated for the pair of the previous frame and the current frame (N−1, N) is converted to an opposite sign.

In the estimation of the backward motion field BW, a temporal candidate is selected from the forward motion field FW estimated for a pair of the current frame and a subsequent frame (N, N+1).

In more detail, in the estimation of the backward motion field BW, a temporal candidate may be selected from a motion field in which the forward motion field FW estimated for the pair of the current frame and the subsequent frame (N, N+1) is projected in an inverted direction.

A process of projecting a motion field includes a process of selecting a motion vector of a current block in a motion field to be projected and inputting a value of the selected motion vector to a block of a projected motion field.

A motion estimation method, according to an embodiment of the disclosure, may use a semi-global candidate vector estimated using the forward motion field FW<N>, to estimate vectors in a backward motion field BW<N>.

Figure 8:
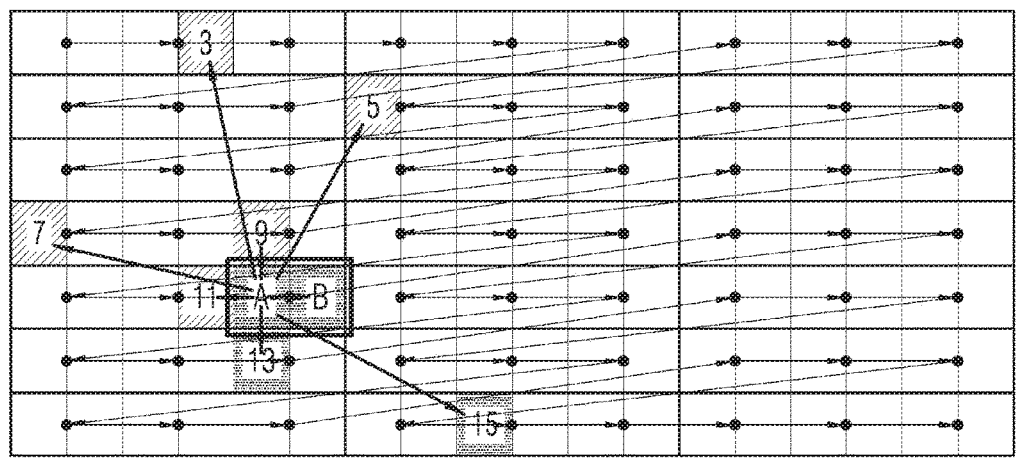
FIG. 8 illustrates a motion estimation method using a double block of an extended 3DRS motion estimation algorithm, according to an embodiment of the disclosure.

FIG. 8 illustrates a motion estimation method using a double block of an extended 3DRS motion estimation algorithm, according to an embodiment of the disclosure.

A unit processed by the motion estimation method according to the present embodiment may be a double block, and the double block corresponds to one pair of neighboring single blocks to be processed together.

In this case, only one candidate vector set may be used for the double block, and each candidate vector included in the candidate vector set may be simultaneously estimated through a single scanning loop for the one pair of single blocks constituting the double block. The use of the one candidate vector set may cause a candidate vector calculation cost to be reduced.

Referring to FIG. 8, a first single block A and a second single block B are simultaneously analyzed in a double block A+B. For the double block A+B, a candidate vector set including a total of nine candidate vectors may be acquired by selecting spatial candidate vectors is selected from the third block 3, the fifth block 5, the seventh block 7, the ninth block 9, and the eleventh block 11 and selecting temporal candidate vectors from the first single block A, the second single block B, the thirteenth block 13, and the fifteenth block 15.

The candidate vector set for the double block A+B is substantially the same as a candidate vector set for the first single block A, and the selected nine candidate blocks may be analyzed according to an existing approach to the first single block A which is a single block.

Therefore, the number of sources of the spatial candidate vectors and the temporal candidate vectors corresponds to a half of a case where the candidate vector set shown in FIG. 4 is individually formed for each single block.

As described additionally, an analysis of additional candidates for a second block of the double block A+B, that is, candidates for the second single block B, occurs only when a confidence function value CF (MVcand, block) of one pair of single blocks satisfies a particular condition.

In addition, when a block from which a spatial candidate vector is to be selected is identified, it is needed to satisfy a condition that a rightmost block does not cross over a wavefront boundary, since vectors of a current motion field have not been estimated on or over the wavefront boundary.

Figure 9:
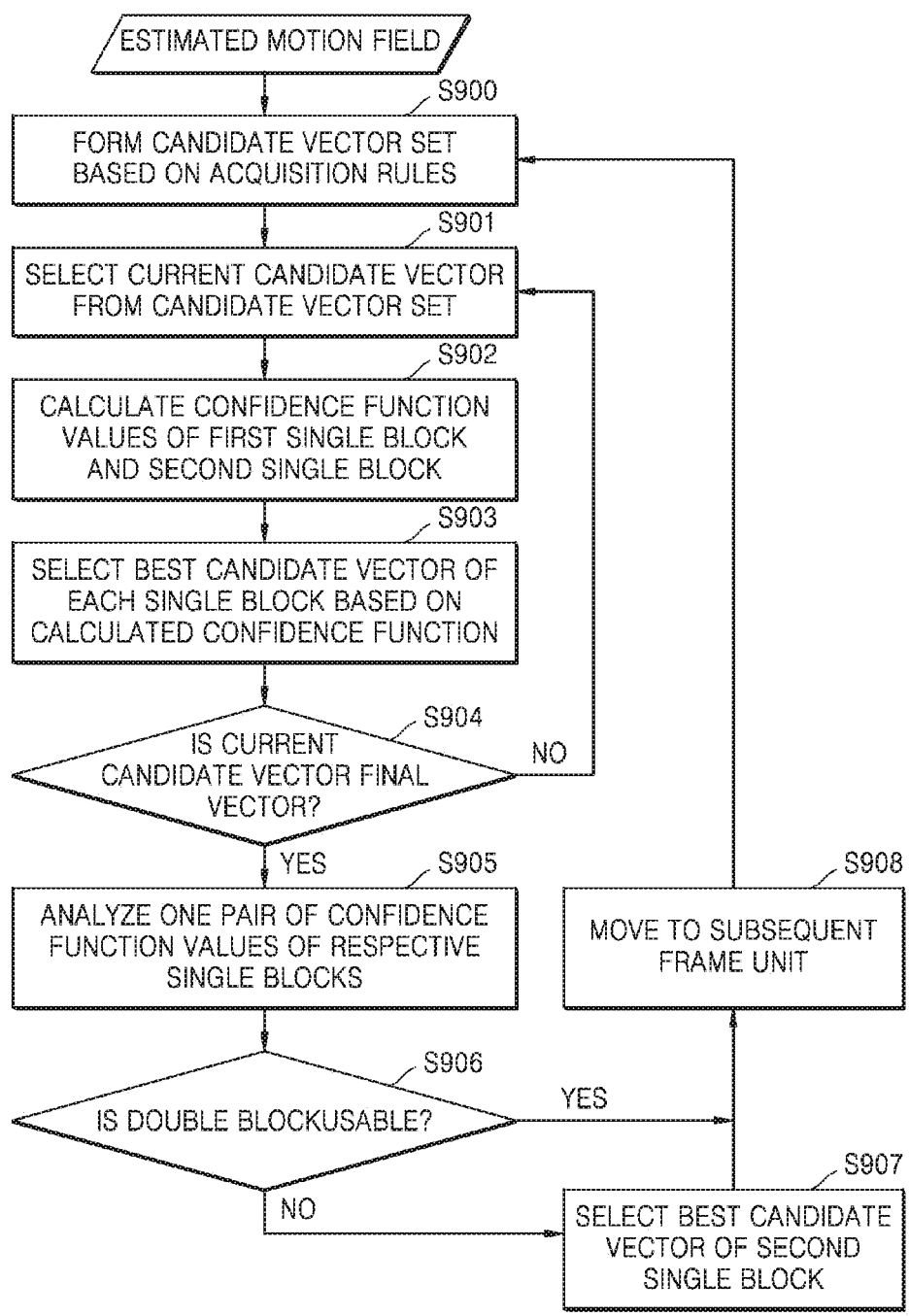
FIG. 9 is a flowchart of a 3DRS for a plurality of frames, according to an embodiment of the disclosure.

FIG. 9 is a flowchart of a 3DRS for a plurality of frames, according to an embodiment of the disclosure.

In operation S900, a candidate vector set for a current frame unit is formed by specifying an acquisition rule set.

According to the present embodiment, the current frame unit corresponds to a double block except for several exceptions.

The candidate vector set for the current frame unit, which is acquired in operation S900, includes a candidate vector set for any one single block (for example, a first single block) of two neighboring single blocks of the current frame unit.

For example, as shown in FIG. 8, a candidate vector of the double block A+B is first selected from the first block 1 according to an acquisition rule. The same acquisition rule may be applied to all units in a frame, and different acquisition rules may be applied to a forward motion field and a backward motion field.

An acquisition rule set may include one or more acquisition rules as follows. In this case, it is assumed that a scan sequence progresses from the left to the right and from the top to the bottom.

(1) A motion vector estimated from a block in a previous motion field is acquired, and coordinates of the block in the previous motion field are the same as coordinates of the current frame unit.

(2) A motion vector estimated from a block in a motion field to be estimated is acquired, and coordinates of the block are the same as coordinates obtained by adding one unit offset in the left direction to the coordinates of the current frame unit.

(3) A motion vector estimated from a block in the motion field to be estimated is acquired, and coordinates of the block are the same as coordinates obtained by adding one unit offset in the up direction to the coordinates of the current frame unit.

(4) A motion vector estimated from a block in the previous motion field is acquired, and coordinates of the block in the previous motion field are the same as coordinates obtained by adding one block offset in the right direction to the coordinates of the current frame unit.

(5) A motion vector estimated from a block in the previous motion field is acquired, and coordinates of the block in the previous motion field are the same as coordinates obtained by adding one block offset in the down direction to the coordinates of the current frame unit.

(6) A random offset in an XY range [−3 . . . 3][−2 . . . 2] is acquired.

(7) The best candidate vector is acquired from previously estimated candidate vectors, and a random offset in an XY range [−3 . . . 3][−2 . . . 2] is acquired.

Since the rule list described above includes seven rules, it is considered that a maxim number of seven candidate vectors exist for each frame unit. When values of all candidate vectors are identical, it is meaningless to evaluate the same offset several times, and thus it is considered that the minimum number of candidate vectors is 1.

The motion estimation method in the disclosure is not limited to the particular acquisition rules described above, and it would be understood by those of ordinary skill in the art that other acquisition rules can be used without departing from the disclosure.

The rule (7) does not allow that a candidate vector set is fully formed before the current frame unit is processed, since it cannot be obtained in advance which one of candidate vectors is the best candidate vector. The best candidate vector will be clear only after a confidence function to be described below is calculated.

In operation S901, a current candidate vector is selected from the candidate vector set formed on the basis of the pre-defined acquisition rule set.

In operation S902, a CF(MVcand, A) and a CF(MVcand, B) of respective single blocks (for example, a first block and a second block) of a current double block are calculated based on the selected current candidate vector.

The confidence function CF(MVcand, block) may be obtained by a sum of MAD(MVcand, block) and f(Prior, MVcand), where MAD stands for mean absolute difference and may be obtained by Equation 1.

$$MAD(v_x, v_y) = \frac{1}{M \cdot L} \sum_{i=0}^{L-1} \sum_{j=0}^{M-1} \left| F_N(x+i, y+j) - F_{N+1}(x+i+v_x, y+j+v_y) \right| \qquad \text{Equation 1}$$

where $(v_x, v_y)$ denotes a candidate vector (offset), (x, y) denotes pixel coordinates of a current block, (M, L) denotes a linear size of the current block, FN and FN+1 denote a current frame and a subsequent frame (for a forward motion field search), f(Prior, MVcand) denotes a penalty function using previously calculated information and used for additional regularization of a motion field (the previously calculated information may be information regarding a global motion or a semi-global motion), MVcand denotes a candidate vector being analyzed, and (block) denotes coordinates or a position of a (current) block in a current frame.

The higher a confidence function value, the lower a degree of confidence of a candidate vector, and the lower the confidence function value, the higher the degree of confidence of the candidate vector.

In operation S903, when the CF(MVcand, block) of the current candidate vector has a lower value than those of previous candidate vectors, the current candidate vector is stored in a memory as the best candidate vector.

When the best candidate vector is not yet stored in the memory, the current candidate vector may be stored in the memory as the best candidate vector.

When the best candidate vector is already stored in the memory, a candidate vector having a less CF(MVcand, block) value may be stored as the best candidate vector through comparison between a CF(MVcand, block) value of the current candidate vector, a subsequent candidate vector, and a CF(MVcand, block) value of the stored best candidate vector.

For example, when a first candidate vector is already stored in the memory as the best candidate vector, and a CF(MVcand, block) value of a third candidate vector, the current candidate vector, is less than a CF(MVcand, block) value of the first candidate vector, the third candidate vector may be stored in the memory as the best candidate vector instead.

In operation S904, it is checked whether the acquired current candidate vector is a final vector of the current frame unit, that is, a last candidate vector in the pre-defined candidate vector set.

When the current candidate vector is not the last vector, the motion estimation method proceeds back to operation S901 to analyze a next candidate vector. Otherwise, when the current candidate vector is the last vector, the motion estimation method proceeds to operation S905.

As a result, after an analysis on all candidate vectors for the current frame unit is finished, a candidate vector having the minimum CF(MVcand, block) value may be stored in the memory as the best candidate vector.

In operation S905, one pair of CF(MVcand, block) values of the respective single blocks included in the double block which is the current frame unit, that is, the current double block, are analyzed.

In more detail, a difference value d(BA) is calculated based on a difference between a CF(MVcand best B,B) of a second single block of the current double block and a CF(MVcand best A,A) of the first single block of the current double block. The calculated difference value d(BA) is compared with a certain difference threshold $T_{diff}$.

The difference value d(BA) exceeding the difference threshold $T_{diff}$ indicates that the difference between the CF(MVcand best B,B) and the CF(MVcand best A,A) is relatively high, and may indicate that the first single block and the second single block are located on a motion boundary (that is, belong to objects of which motions differ from each other).

In addition, a CF(MVcand best B,B) value of the second single block of the current double block may be compared with a pre-defined absolute threshold $T_{abs}$ in operation S905, to indicate whether the CF(MVcand best B,B) value corresponds to an excessively large value.

When a particular candidate vector is analyzed, a CF(MVcand, block) value is individually calculated for each block of a double block.

When a CF(MVcand, block1) value calculated for any one single block included in a double block is less than a confidence function value calculated for all previous candidate vectors applied to the any one single block, a current candidate vector may be the best vector of the double block. In this case, a CF(MVcand, block2) value calculated for the other single block included in the double block may be greater than a CF(MVcand best2, block2) value of a previously analyzed candidate vector MVcand best2.

Therefore, the single blocks included in the double block may have different best candidate vector and confidence function values, respectively.

In operation S906, it is determined whether the current frame unit is analyzed as two individual single blocks or usable as a double block, based on the analysis performed in operation S905.

According to an embodiment, when the value d(BA) of the current frame unit is greater than the threshold $T_{diff}$, and the CF(MVcand best B,B) value is greater than the threshold $T_{abs}$, it is determined that the two single blocks are individually analyzed.

The pre-defined values $T_{diff}$ and $T_{abs}$ may enable quality of a motion field to be adjusted, that is, negotiation between a degree of the proximity of an estimated motion field to a real motion field and a motion estimation speed to be performed.

In more detail, when $T_{diff}$ and $T_{abs}$ having relatively high values are defined, an analysis on an additional candidate may occur less frequently, and a motion estimation speed may increase, but quality of a motion field may slightly decrease, and in an opposite case, when $T_{diff}$ and $T_{abs}$ having relatively low values are defined, an analysis on an additional candidate may occur more frequently, and a motion estimation speed may decrease, but quality of a motion field may slightly increase.

When it is determined in operation S906 that the current frame unit is usable as a double block, the motion estimation method proceeds to operation S908 to change a frame unit to be processed to a subsequent frame unit (in this case, a subsequent double block of the current frame unit, that is, the current double block, according to a scan sequence), and all the above-described operations of the motion estimation method are executed on the subsequent frame unit.

Otherwise, when it is determined in operation S906 that the current frame unit is individually analyzed as two single blocks, the motion estimation method proceeds to operation S907 to form a candidate vector set for the second single block B. As a result, a CF(MVcand B,B) value of each candidate vector of the second single block B is calculated, and a candidate vector of which a CF(MVcand B,B) value is the minimum is selected as the best candidate vector of the second single block B.

That is, according to the present embodiment, the double block used in operations S901 to S904 may commonly use, for two single blocks, a candidate vector set for any one single block. As a result, the number of candidate vectors is relatively reduced, and calculation of a confidence function value is less required, and thus a motion estimation speed may increase. In addition, a memory access pattern is improved, and thus computation complexity and power consumption may be reduced.

Figure 10:
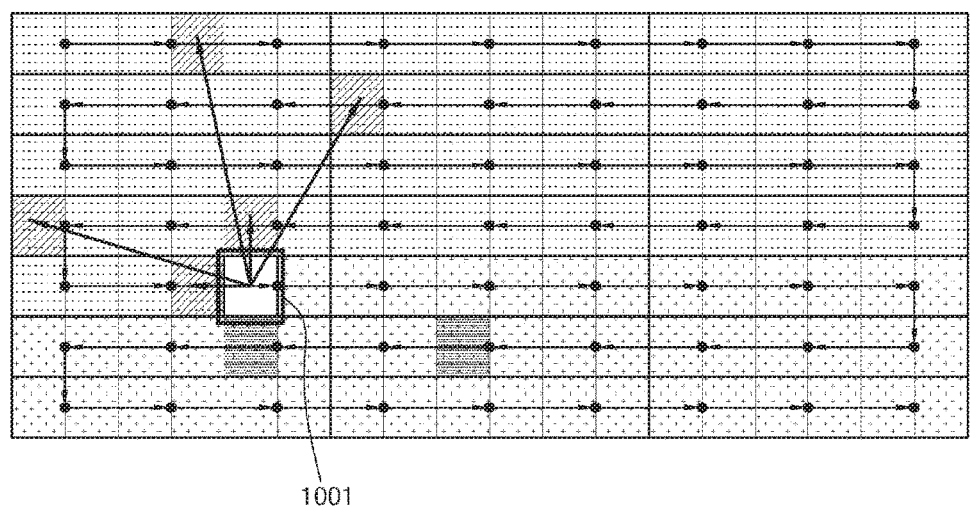
FIG. 10 shows an example of an existing 3DRS using a full-frame meandering scan sequence according to an embodiment of the disclosure.

FIG. 10 shows an example of an existing 3DRS using a full-frame meandering scan sequence according to an embodiment of the disclosure.

According to an existing meandering scan sequence, an image is divided into rows of blocks, and scan is performed in a row direction. This scan method causes parallelization to be impossible since all previous blocks are included in a dependency tree.

Referring to FIG. 10, arrows of a current frame unit 1001 indicate a plurality of blocks from which a candidate vector is acquired for a current block. Therefore, there exists dependency that processing of the current frame unit 1001 is possible only when a particular block of a frame is already processed.

In the existing 3DRS, all frame units coming next to the current frame unit 1001 depend on the current frame unit 1001, and all frame units prior to the current frame unit 1001 must be processed earlier than the current frame unit 1001.

Figure 11:
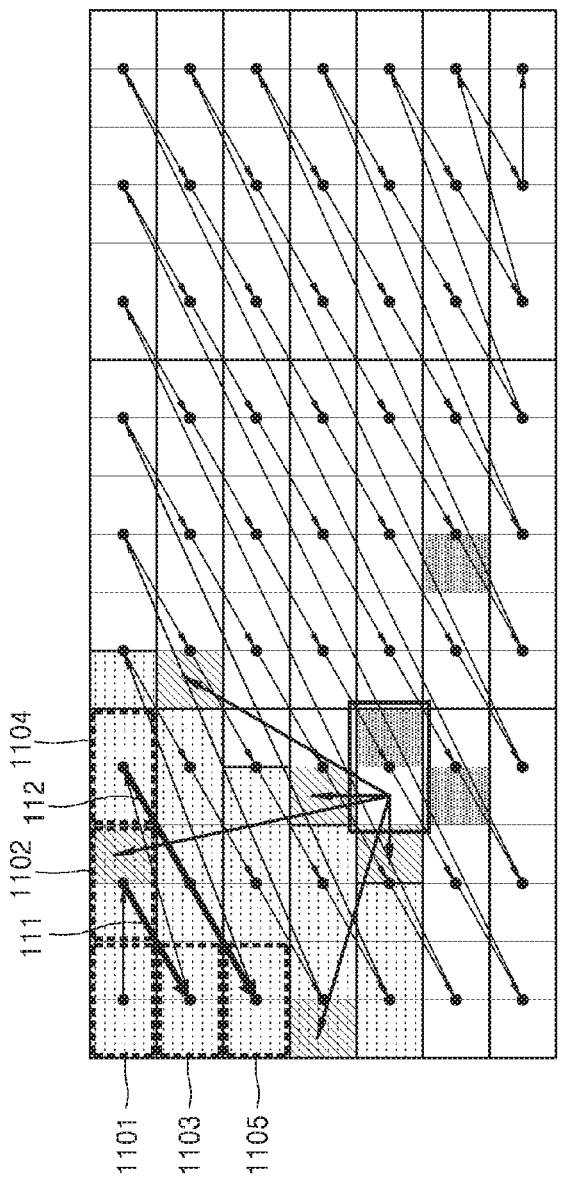
FIG. 11 shows an example of a 3DRS having a wavefront scan sequence according to an embodiment of the disclosure.

FIG. 11 shows an example of a 3DRS having a wavefront scan sequence according to an embodiment of the disclosure.

A general wavefront method is used to parallelize blocks without dependency in a current picture or slice to be encoded or decoded.

Referring to FIG. 11, a component to be scanned is a group of blocks looked like a rolling wave, and each block is processed in a diagonal direction instead of a row unit. In this case, scan of each block is performed in a direction from up right to down left.

For example, as shown in FIG. 11, after a first frame unit 1101 of a first row of a current frame is processed, a second frame unit 1102 of the first row, which is adjacent to the right of the first frame unit 1101 of the first row, and a second frame unit 1103 of a first column, which is adjacent to a lower side of the first frame unit 1101 of the first row, are sequentially processed in a first diagonal direction 111.

Thereafter, a third frame unit 1104 of the first row to a third frame unit 1105 of the first column are sequentially processed in a second diagonal direction 112, and all subsequent frame units are processed in a similar method to the frame units corresponding to the first diagonal direction 111 and the second diagonal direction 112. In this case, processing dependency allows parallel processing.

For example, as shown in FIG. 11, since frame units in a diagonal direction are independent to each other, the frame units may be processed in parallel. However, this processing is very discontinuous in an access to a memory, and thus inevitably, the performance may be significantly lowered in relation to a meander or raster scan sequence.

Figure 12:
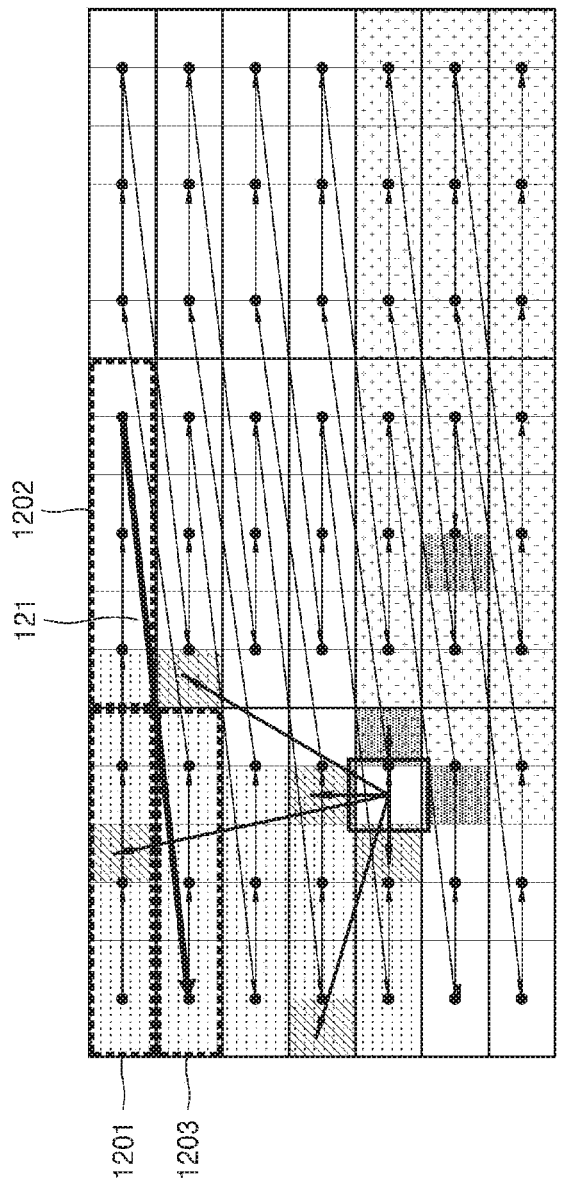
FIG. 12 shows a scan sequence for a frame divided into frame units of a double block, according to an embodiment of the disclosure.

FIG. 12 shows a scan sequence for a frame divided into frame units of a double block, according to an embodiment of the disclosure.

According to the present embodiment, the frame is commonly divided into aggregate frame units, each indicating a set of adjacent frame units (for example, double blocks) of a row. A scan sequence of the aggregate frame units may be the same as the scan sequence of the wavefront processing method described above.

Referring to FIG. 12, after a first aggregate frame unit 1201 of a first row of a current frame is processed, a second aggregate frame unit 1202 of the first row, which is adjacent to the right of the first aggregate frame unit 1201 of the first row, and a second aggregate frame unit 1203 of a first column, which is adjacent to a lower side of the first aggregate frame unit 1201 of the first row, are sequentially processed in a first diagonal direction 121.

In this case, similarly to that frame units in a diagonal direction in FIG. 11 may be processed in parallel since the frame units are independent to each other, aggregate frame units in a diagonal direction in FIG. 12 may also be processed in parallel since the aggregate frame units are independent to each other.

Compared with the existing wavefront processing method described above, this method may improve a memory access pattern by allowing sequential processing of elements of a raster scan sequence in a single thread, that is, a plurality of frame units from the left to the right. As a result, the general performance of the motion estimation method may be improved while motion field quality does not decrease.

Figure 13:
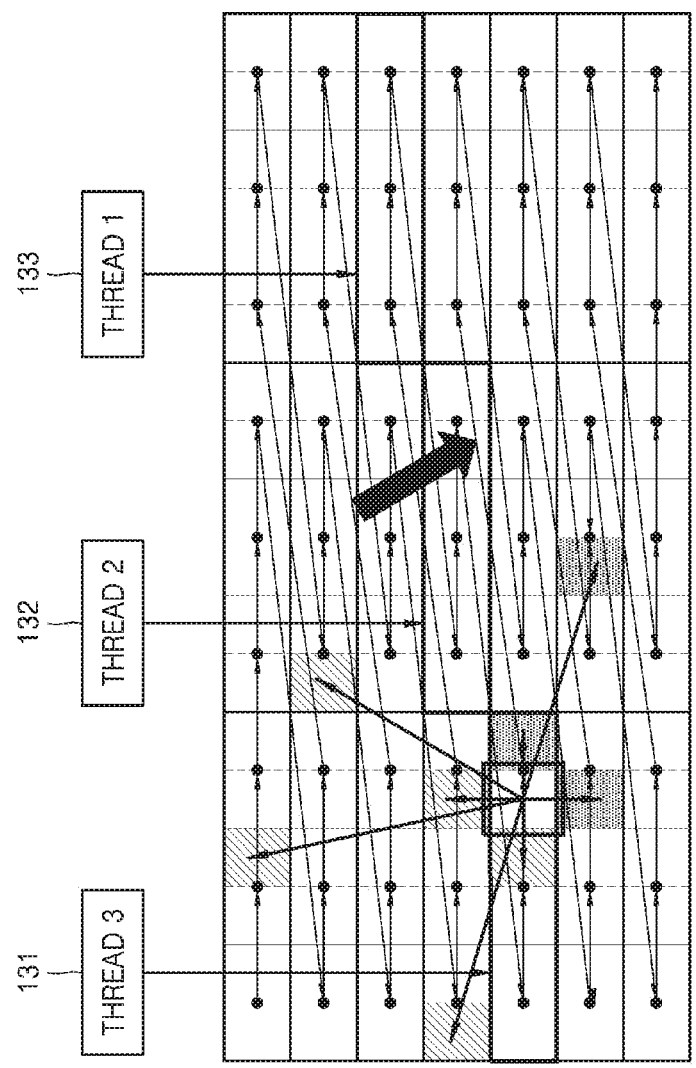
FIG. 13 shows a scan sequence for aggregate frame units, each including three double blocks, according to an embodiment of the disclosure.

FIG. 13 shows a scan sequence for aggregate frame units, each including three double blocks, according to an embodiment of the disclosure.

Referring to FIG. 13, three processing threads 131, 132, and 133 exist, and an aggregate frame unit includes three neighboring double blocks in one row.

Double blocks in each aggregate frame unit in each thread are sequentially processed, and a memory access is sequentially performed by a localized method. Therefore, independent parallel processing on most of an image is allowed.

Figure 14:
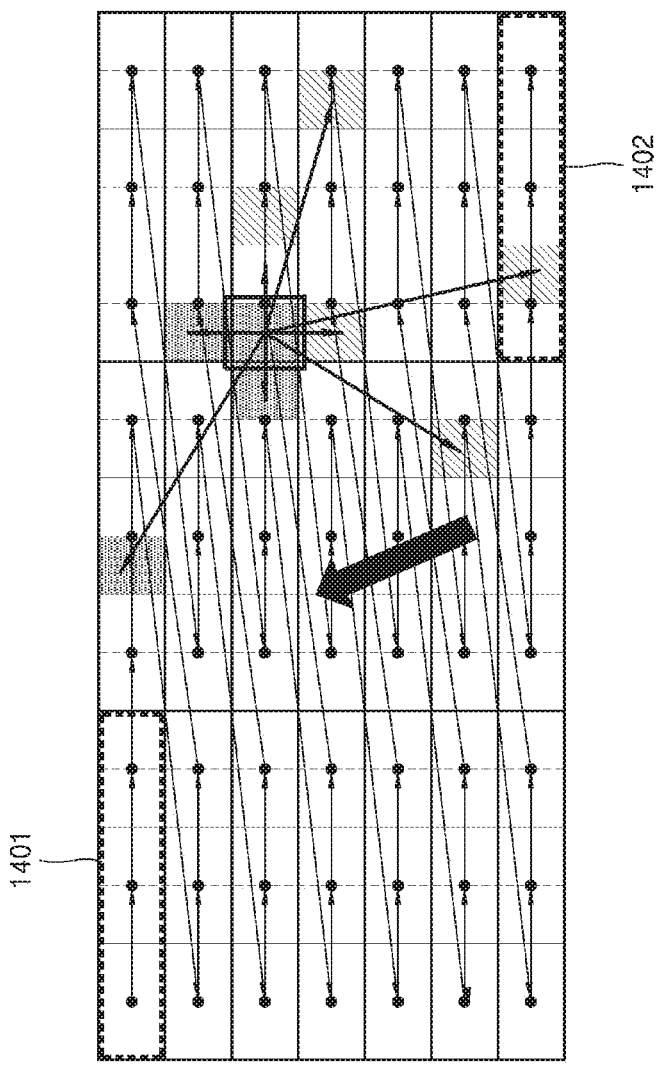
FIG. 14 shows a backward frame scan sequence for aggregate frame units, according to an embodiment of the disclosure.

FIG. 14 shows a backward frame scan sequence for aggregate frame units, according to an embodiment of the disclosure.

The above-described frame unit in FIGS. 10 to 13 correspond to a double block, but the frame unit may be a single block.

In the wavefront processing method for aggregate frame units, another modified example of frame scanning may also be used.

Referring to FIG. 14 shows a diagram of backward scanning starting from a last aggregate frame unit 1402 of a last row instead of starting from a first aggregate frame unit 1401 of a first row.

A scan sequence may be appropriately changed for each frame based on this backward scanning method, and quality of an estimated motion field may be improved.

In detail, each motion field varies according to a previously estimated motion field, and thus generally, when a scan sequence is changed for all previously estimated motion fields, all motion fields except for a first estimated motion field may be improved.

Figure 15:
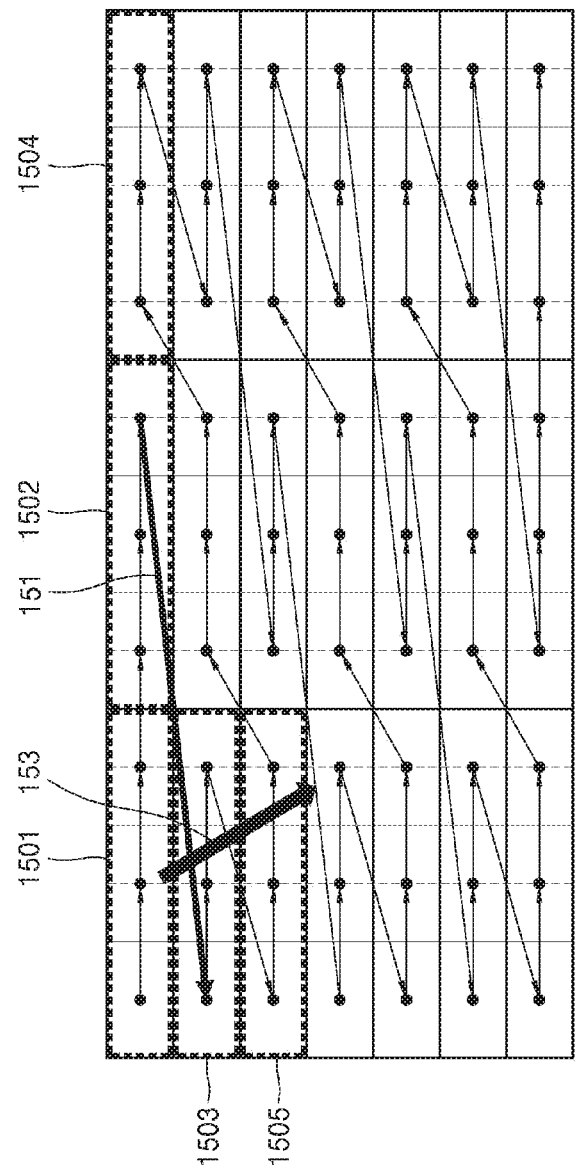
FIG. 15 shows a scan sequence for aggregate frame units, each including three double blocks, according to an embodiment of the disclosure.

FIG. 15 shows a scan sequence for aggregate frame units, each including three double blocks, according to another embodiment of the disclosure.

Referring to the scan sequence in FIG. 15, similarly to the embodiments shown in FIGS. 12 and 13, after a first aggregate frame unit 1501 of a first row of a current frame is processed, a second aggregate frame unit 1502 of the first row, which is adjacent to the right of the first aggregate frame unit 1501 of the first row, and a second aggregate frame unit 1503 of a first column, which is adjacent to a lower side of the first aggregate frame unit 1501 of the first row, are sequentially processed in a first diagonal direction 151.

Unlike the embodiments shown in FIGS. 12 and 13, a processing sequence thereafter does not continue to a third aggregate frame unit 1504 of the first row but continues to a third aggregate frame unit 1505 of the first column, that is an aggregate frame unit which is adjacent to a lower side of the second aggregate frame unit 1503 of the first column (in a direction 153).

This modification of a frame scan sequence enables much less hop changes to be used in a frame, and thus a memory access may be better localized, thereby improving the motion estimation performance.

Figure 16:
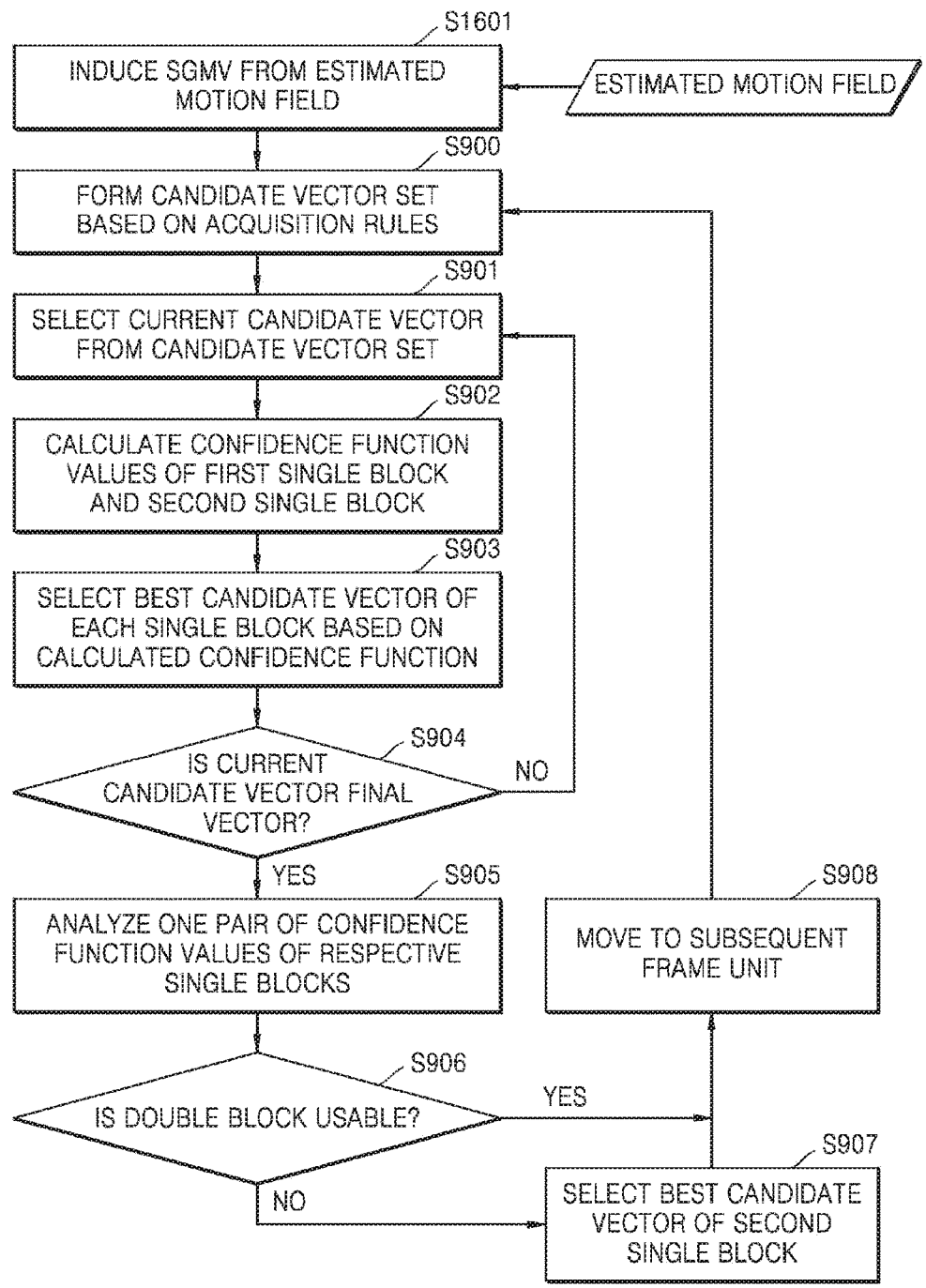
FIG. 16 is a flowchart of a 3DRS for a plurality of frames using a semi-global motion candidate vector, according to an embodiment of the disclosure.

FIG. 16 is a flowchart of a 3DRS for a plurality of frames using a semi-global motion candidate vector, according to an embodiment of the disclosure.

In a 3DRS using a semi-global motion candidate vector, a candidate vector set further includes additional candidate vectors induced based on a semi-global motion estimated in a previous motion field, in addition to spatial candidate vectors from a current motion field and temporal candidate vectors from the previous motion field.

In operation S1601, to obtain the additional candidate vector, a 2D histogram of the previous motion field is analyzed, and a semi-global motion vectors (SGMVs) is induced from the analyzed 2D histogram. These SGMVs may be coordinates of a plurality of peaks of the 2D histogram.

In this case, a mask corresponding to each SGMV may be formed, and each mask may indicate in which portion of a frame a motion vector exists.

In the disclosure, when it is determined that a motion corresponding to an SGMV may exist in a frame unit, it is assumed that a mask corresponding to each SGMV is activated in each frame unit.

In addition, when the cycle of operations S901 to S904 is performed, if a current frame unit (a single block or a double block) belongs to an applicability mask region of an SGMV, a random candidate vector to be additionally included in a candidate vector set for the current frame unit may be acquired based on the SGMV.

Therefore, the existence possibility of an SGMV of the current frame unit may be identified through an applicability mask corresponding to each SGMV.

In this case, a random offset is added to the SGMV, and a random candidate vector according to a result of the addition is added to the candidate vector set.

In operation S903, in terms of a distance between vectors, which is calculated by an arbitrary method, an additional penalty may be given to a candidate vector spaced apart far from the closest SGMV candidate.

A current candidate vector to which a penalty is given decreases according to a decrease in a distance between the closest SGMV and the current candidate vector, based on a penalty function value.

In addition, the current candidate vector to which a penalty is given approaches zero when a mask of the closest SGMV is in an activated state based on the penalty function value, and approaches a value VPmin greater than zero but less than a maximum value VPmax of the penalty function value when the mask of the closest SGMV is not in the activated state.

A motion field may be regularized through this penalty function value monotonic process.

Unlike an existing method in which all discovered global motion vectors are considered as additional candidate vectors, in the disclosure, when an applicability mask is matched with a location of a current frame unit, that is, only motion vectors of which an applicability mask is in an activated state are used to acquire additional candidate vectors. This is the reason why the present 3DRS method is used to acquire additional candidate vectors based on "semi-global" motion.

Figure 17A:
FIGS. 17A, 17B, and 17C show frames to which a semi-global motion is applied, according to various embodiments of the disclosure.
Figure 17B:
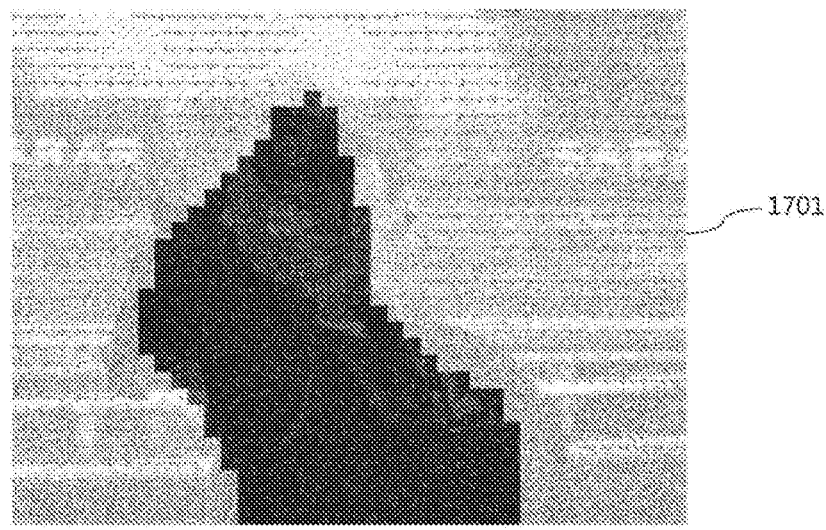
Figure 17C:
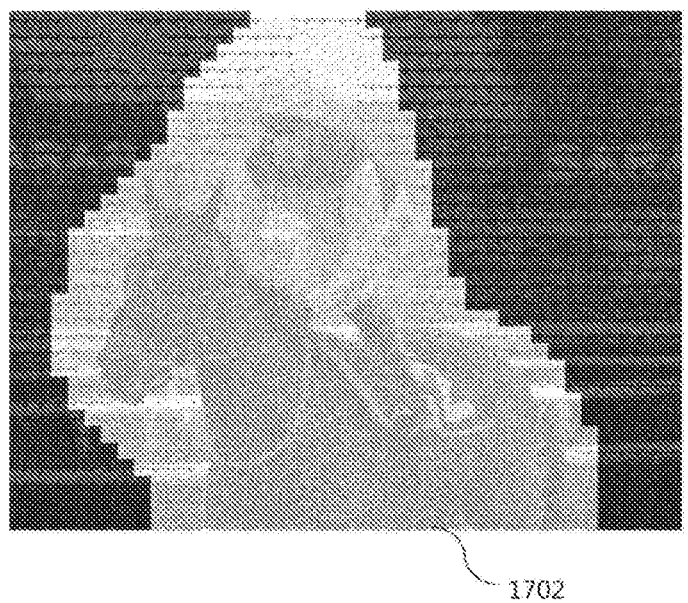

FIGS. 17A to 17C show frames to which a semi-global motion is applied, according to various embodiments of the disclosure.

Referring to FIG. 17A, an example of a single frame 1700 showing a scene in which a rider rides a horse is shown, wherein an estimated motion vector of a previous motion field for each frame unit is shown all over the frame 1700.

According to the present embodiment, since a camera moves along the movement of the rider, the rider and the horse hardly move between frames. In this case, the movement of the rider and the horse corresponds to a vector SGMV2=(1, 1) (that is, a vector indicates a location to the right by one pixel and to the bottom by one pixel), whereas a background quickly moves between the frames and may correspond to a vector SGMV1=(8, 1) (that is, a vector indicates a location to the right by eight pixels and to the bottom by one pixel).

Respective applicability masks for the vectors SGMV1 and SGMV2 are shown through a white overlap region 1701 of FIG. 17B and a white overlap region 1702 of FIG. 17C.

According to an embodiment of the disclosure, an integrated 3DRS method of the embodiments described above may be used together with extended wavefront double block processing of a frame using a semi-global motion.

In relation to this method, referring back to FIG. 16, in operation S1601, a semi-global motion is searched for from a previous motion field, and an applicability mask for each SGMV is formed.

Next, in operation S900, a candidate vector set for the current frame unit is formed based on acquisition rules.

Thereafter, the cycle of operations S901 to S904 is performed based on additional SGMVs corresponding to applicability masks and penalty function values for regularization of a motion field.

When all candidate vectors for the current frame unit are analyzed, in operation S905, a confidence function value of each block in the current frame unit is estimated.

In operation S906, it is determined whether processing of a single block is needed, based on the confidence function value of each block in the current frame unit.

When the processing of a single block is not needed (that is, when a double block is usable), in operation S908, a subsequent frame unit is processed.

Otherwise, when the processing of a single block is needed, the single block is processed in operation S907, and then operation S908 is performed.

Operations S900 to S908 may be executed in parallel by several threads, and individual aggregate frame units may be processed by respective threads. In this case, the aggregate frame units may be scanned in a diagonal direction starting from one corner of a frame.

This integrated 3DRS method has all the effects of the three embodiments of the disclosure and has an effect of enabling motion estimation in response to frame rate conversion to be improved without decreasing quality.

The motion estimation method of the disclosure may be implemented by software and may be operated in real-time in a mobile device to convert a frame rate with low power.

Particularly, the motion estimation method of the disclosure may be applied to playback of full-high definition (FHD) content, FHD+content, and wide quad high definition (WQHD) content requiring frame rate conversion to 15-30 or 30-60 frames/sec and may also be applied to video communication, online conference (for example, webinars), and a case of restoring a frame speed according to a loss in a transmission channel by using frame rate conversion.

Table 1 below is an example summary of test results of the existing 3DRS algorithm and the motion estimation algorithm according to the disclosure under certain conditions.

TABLE 1

| Algorithm | Test result | |
|---|---|---|
| | Time/ frame pair [ms] | Mean of internal data set PSNR [dB] |
| Basic 3DRS | 22.96 | 34.73 |
| General wavefront, single block processing, 1 thread | 31.41 | 34.24 |
| General wavefront, single block processing, 2 threads | 18.15 | 34.24 |
| Extended wavefront, single block processing, 1 thread | 28.19 | 34.24 |
| Extended wavefront, single block processing, 2 threads | 15.77 | 34.24 |
| Extended wavefront, double block processing, 2 threads | 14.82 | 34.22 |
| Extended wavefront, single block processing, 2 threads, using semi-global mode | 15.91 | 34.61 |

According to the motion estimation method and apparatus according to the disclosure, motion estimation quality may be increased by using a double block as a current frame unit for which motion estimation is to be performed.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A motion estimation method for a plurality of frames, the motion estimation method comprising:
   determining whether a current frame unit for which motion estimation is to be performed corresponds to a double block;
   when the current frame unit corresponds to the double block, acquiring a candidate vector set corresponding to a first single block included in the double block, as a candidate vector set of the double block;
   individually calculating a confidence function value of each candidate vector included in the candidate vector set of the double block, for the first single block and a second single block included in the double block; and
   acquiring an estimated motion vector of the first single block and an estimated motion vector of the second single block, based on the calculated confidence function value of each candidate vector.

2. The motion estimation method of claim 1, wherein the acquiring of the estimated motion vector of the first single block and the estimated motion vector of the second single block comprises:
  selecting a candidate vector having a minimum confidence function value for the first single block among the candidate vectors as the estimated motion vector of the first single block; and
  selecting a candidate vector having a minimum confidence function value for the second single block among the candidate vectors as the estimated motion vector of the second single block.

3. The motion estimation method of claim 1, wherein the candidate vector set comprises at least one of spatial candidate vectors, temporal candidate vectors, or random candidate vectors.

4. The motion estimation method of claim 3, wherein the random candidate vector is acquired by adding a random offset to a semi-global motion vector (SGMV) of the current frame when an applicable mask in the current frame unit is in an activated state.

5. The motion estimation method of claim 4, wherein the SGMV is acquired through an analysis on a two-dimensional histogram of a previously estimated motion field of the current frame, and the applicable mask is formed in a frame region in which an object motion corresponding to the acquired SGMV exists.

6. The motion estimation method of claim 4, wherein the individually calculating the confidence function value of each candidate vector comprises:
  calculating a mean absolute difference (MAD) between blocks, which is indicated by the current frame unit and each candidate vector;
  calculating a penalty function value based on a distance between each candidate vector and the SGMV; and
  acquiring the confidence function value by adding the MAD and the penalty function value.

7. The motion estimation method of claim 1, further comprising:
  analyzing a confidence function value of the estimated motion vector of the first single block and a confidence function value of the estimated motion vector of the second single block;
  determining whether a motion vector of the second single block is individually estimated, based on the analysis result; and
  when it is determined that the motion vector of the second single block is individually estimated, re-acquiring an estimated motion vector of the second single block.

8. The motion estimation method of claim 7, wherein the re-acquiring of the estimated motion vector of the second single block comprises:
  acquiring a candidate vector set corresponding to the second single block; and
  selecting a candidate vector having a minimum confidence value for the second single block among candidate vectors of the second single block, as the estimated motion vector of the second single block.

9. The motion estimation method of claim 7, wherein the analyzing of the confidence function value of the estimated motion vector of the first single block and the confidence function value of the estimated motion vector of the second single block comprises:
  calculating an absolute value of a difference between the confidence function value of the estimated motion vector of the first single block and the confidence function value of the estimated motion vector of the second single block; and
  comparing the calculated absolute value with a preset first threshold.

10. The motion estimation method of claim 9, wherein the determining of whether the motion vector of the second single block is individually estimated comprises determining that the motion vector of the second single block is individually estimated, when the calculated absolute value is greater than or equal to the first threshold.

11. The motion estimation method of claim 7, wherein the analyzing of the confidence function value of the estimated motion vector of the first single block and the confidence function value of the estimated motion vector of the second single block further comprises comparing the confidence function value of the estimated motion vector of the second single block with a preset second threshold.

12. The motion estimation method of claim 11, wherein the determining of whether the motion vector of the second single block is individually estimated comprises determining that the motion vector of the second single block is individually estimated, when the confidence function value of the estimated motion vector of the second single block is greater than or equal to the second threshold.

13. The motion estimation method of claim 1, wherein the acquiring of the candidate vector set corresponding to the first single block as the candidate vector set of the double block comprises:
  selecting a temporal candidate vector from a backward motion field estimated for a pair of a previous frame and a current frame in estimation of a forward motion field for the current frame; and
  selecting a temporal candidate vector from a forward motion field estimated for a pair of the current frame and a subsequent frame in estimation of a backward motion field for the current frame.

14. The motion estimation method of claim 1, wherein the motion estimation is performed for aggregate frame units indicating a set of neighboring frame units in a row of a frame, and the aggregate frame units is scanned in a diagonal scanning direction starting from an aggregate frame unit located at any one edge among edges of the frame.

15. The motion estimation method of claim 14, wherein the motion estimation is simultaneously performed in two or more processing threads configured to individually process each aggregate frame unit.

16. A motion estimation apparatus for a plurality of frames, the motion estimation apparatus comprising:
  at least one processor configured to:
    determine whether a current frame unit for which motion estimation is to be performed corresponds to a double block,
    when the current frame unit corresponds to the double block, acquire a candidate vector set corresponding to a first single block included in the double block, as a candidate vector set of the double block,
    individually calculate a confidence function value of each candidate vector included in the candidate vector set of the double block, for the first single block and a second single block included in the double block; and
    acquire an estimated motion vector of the first single block and an estimated motion vector of the second single block, based on the calculated confidence function value of each candidate vector; and a memory configured to store the estimated motion vector of the first single block and the estimated motion vector of the second single block.

* * * * *